UNITED STATES PATENT OFFICE.

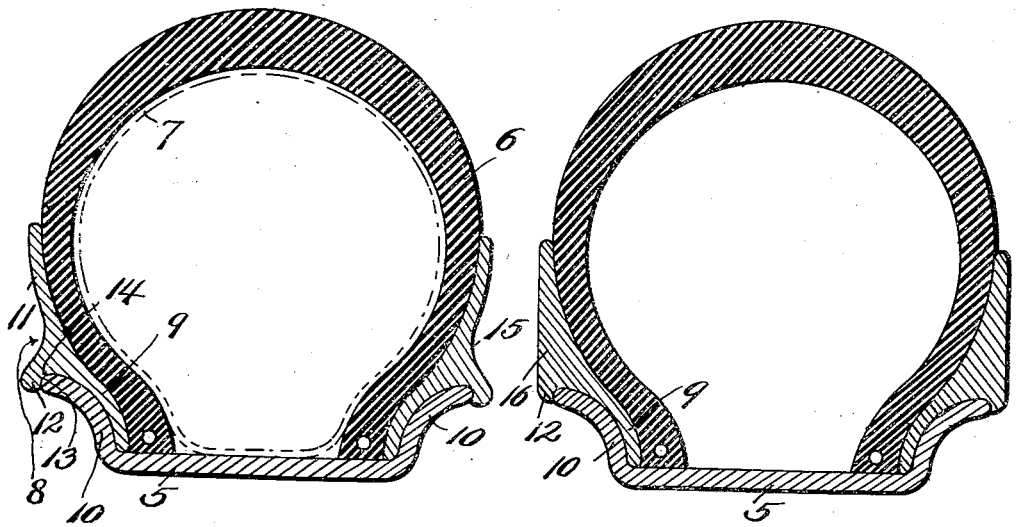

FRANCIS HICKMAN, OF BOUNDBROOK, NEW JERSEY, ASSIGNOR OF ONE-HALF TO BOUND BROOK OIL-LESS BEARING COMPANY, OF BOUNDBROOK, NEW JERSEY, A CORPORATION OF NEW JERSEY.

WHEEL-RIM ATTACHMENT.

1,304,878.   Specification of Letters Patent.   Patented May 27, 1919.

Application filed September 6, 1918. Serial No. 252,866.

*To all whom it may concern:*

Be it known that I, FRANCIS HICKMAN, a citizen of the United States, residing at Boundbrook, in the county of Somerset and State of New Jersey, have invented new and useful Improvements in Wheel-Rim Attachments, of which the following is a specification.

This invention relates to wheel rim attachments particularly adapted for automobile tire rims, and the primary object of the same is to provide a rim attachment for holding tires in positive relation to rims and also protect the opposite side portions of the tire against curb cutting, flying stones or other objects with which said portions of the tire may engage. A further object of the invention is to provide means readily applicable to different forms of tire rims for enlarging the latter to adapt them to receive tires of various dimensions in accordance with the standard makes of tires and rims. A still further object of the invention is to adapt a tire of a specific kind or manufacture to a rim which is too small to receive the same and thereby economize in the use of rim structures or obviate the necessity of replacing rims already in use by new ones at additional cost and thus economize in the application of tires of larger dimensions than the original rims of the vehicle are designed to receive.

With these and other objects and advantages in view, the invention consists in the construction and arrangement of the several parts which will be more fully hereinafter described and claimed.

In the drawing:

Figure 1 is a transverse vertical section through a rim and tire, showing the improved attachment applied thereto.

Fig. 2 is a view similar to Fig. 1, illustrating a slight modification in the structure.

Fig. 3 is a similar view, showing a further modification or the adaptation of the improved attachment to a rim that is usually employed on the Ford automobile wheel.

Referring to Figs. 1 and 2, the numeral 5 designates the usual form of rim to receive a casing 6 with an inclosed inflated tube 7, this rim being of the usual split type. The attachment comprises opposite continuous supports and guards 8, each comprising an inwardly bent flange 9 to bear against the side of the one side flange 10 of the rim 5, and an upper outwardly projecting flange 11 which guards or shields the side portion of the casing 6 and the adjacent part of the tube 7 from injury ordinarily due to curb contact, flying stones, or lateral engagement with other objects. The support and guard also embodies an outer stop projection 12 which bears against the terminal 13 of the flange 10, the stop 12 having a groove 14 to receive the edge 13 of the said flange. Above the stop 12 in the construction of the attachment as shown by Fig. 1, the metal is removed, as at 15, to lighten the attachment and to economize in the use of metal, and in Fig. 2 a thickened structure is shown, as at 16, or the outer side of the attachment from the stop 12 upwardly to the upper edge of the flange 11 is vertically straight instead of being recessed or cut away, which may be a desirable structure in connection with truck tires where durability or greater strength is required. Other than the difference in the lighter and thick constructions of the upper flanges 11 of each attachment, the latter, as shown by Figs. 1 and 2, are precisely similar, and in both forms the combined support and guard has both inner and outer resistances to accidental disengagement thereof, the outer resistance being the stop 12 and the inner resistance the flange 9 which closely fits over and bears against the side flange 10 of the rim 5. The inwardly projecting resisting or stop flange 9, as shown by Figs. 1 and 2, also shields the inner adjacent side portion of the casing which contacts therewith and at the same time reinforces the rim flange. The tighter the casing bears against the opposite members of the attachment or the opposite supports and guards, the more firmly said supports and guards will be held in engagement with the flanges 10 of the rim, and though the inner tube and casing may become deflated or collapse, the supports and guards 8 in engagement with the opposite flanges 10 will still be retained in positive applied position owing to the two resistances or the inner and outer stops relatively to the flanges 10 as provided by the construction of each support and guard hereinbefore specified. The combined supports and guards may be very easily and quickly applied in operative position relatively to the flanges 10 of the rim 5 and they will be retained in positive association with said flanges when the rim is slightly expanded after application thereof to a wheel felly and when the tire components or the casing 6 and tube 7 have been expanded. However, as above noted, the expansion or deflation of the casing 6 and tube 7 do not directly affect the positive association of the combined supports and guards 8 with relation to the flanges 10, the supports and guards being otherwise retained in their applied position.

In Fig. 3 the improved attachment is shown as having an additional function and is constructed for adaptation to the tire rim of a wheel of a Ford machine and whereby a tire of greater dimensions than that usually applicable to a Ford wheel rim may be used in connection with a Ford wheel and thus adapt the latter to receive a larger tire. In the structure shown by Fig. 3, the combined supports and guards are essentially the same in structure and application as those shown by Figs. 1 and 2. The rim 17 as shown by Fig. 3 has inturned side flanges 18 as will be readily understood, and each combined support and guard 8 has the inwardly projecting flange 19 narrower than the corresponding flange 9 shown by Figs. 1 and 2 and the upwardly projecting flange 20 is also slightly shorter than the corresponding flanges 11 heretofore described. Both flanges 19 and 20, however, perform the same function or the flange 19 serves as an inner stop against the flange 18 and the flange 20 serves as a support and guard relatively to the enlarged tire 21 shown for the purpose of illustration in connection with the combined supports and guards in Fig. 3. The supports and guards 8, as shown by Fig. 3, each also has an intermediate outer stop or resistance 22 which bears against the outer portion of the flange 18, and it will be observed, therefore, that this further modified form of the combined support and guard has both an inner and outer resistance or an inner and outer stop to coöperate with the flange 18. The usual Ford wheel rim is not split, and, if required, such rim will be split to accommodate the application of the improved attachments thereto.

The improved attachments will be found exceptionally economical and advantageous in their manufacture and application and use, and it will be understood that the general dimensions and proportions of the several parts may be modified at will to adapt the improved attachments for application to rims of different dimensions if so desired. However, in the manufacture of the attachment comprising the components hereinbefore specified, the dimensions thereof will be standardized or they will be fixed proportionately to adapt them for application to different tires without requiring the preparation of a number of rings varying in general dimensions and proportions.

What is claimed is:

1. The combination with a tire having tire-holding flanges, of rim attachments consisting of rings loosely applied to the flanges and rim and each having an inwardly projecting stop means to engage an inner portion of the adjacent flange and an outer stop means to engage an outer part of such flange, the inner part of each ring being engaged by a portion of the tire and the rings held in place in contact with the flanges and the rim by the lateral pressure of the tire against the inner portions of the rings when the tire is applied to the rings.

2. The combination with a tire rim having opposite side flanges, of supporting rings applied to the flanges and each having an inwardly projecting stop means to engage the inner portion of the flange and also provided with an outer stop means to bear against an outer portion of the flange, each ring also having an upwardly extending flange to bear against the portion of the tire adjacent to the rim as a protective means.

In testimony whereof I have hereunto set my hand in presence of two subscribing witnesses.

FRANCIS HICKMAN.

Witnesses:
AUGUST K. SMITH,
FLOYD W. CASTERLIN.